United States Patent [19]

Rhodes

[11] 4,116,883

[45] Sep. 26, 1978

[54] CATALYST SUPPORT COATING SLURRY AND COATINGS

[75] Inventor: James F. Rhodes, Warren, Mich.

[73] Assignee: General Motors Corporation, Detroit, Mich.

[21] Appl. No.: 553,106

[22] Filed: Feb. 26, 1975

[51] Int. Cl.$^2$ ............................................. B01J 21/04
[52] U.S. Cl. ..................................................... 252/463
[58] Field of Search ......................................... 252/463

[56] References Cited

U.S. PATENT DOCUMENTS

| | | | |
|---|---|---|---|
| 3,554,929 | 1/1971 | Aarons | 252/463 X |
| 3,741,725 | 6/1973 | Graham | 423/213.7 |
| 3,839,224 | 10/1974 | Yonehara et al. | 252/477 R |

*Primary Examiner*—W. J. Shine
*Attorney, Agent, or Firm*—Sidney Carter

[57] ABSTRACT

A catalyst support coating slurry resistant to gel formation and adapted to form a tightly adherent thermally durable coating on a refractory ceramic or metallized ceramic substrate, consisting essentially of fumed alumina in the amount of from 5 to 70 weight percent of the solids and at least one of the active alumina forming materials, e.g., gamma system aluminas, consisting of the alumina hydrates boehmite and pseudoboehmite in the amount of 30 to 95 weight percent of the solids, said aluminas being suspended in sufficient deionized water to form a slurry having the desired application characteristics and constituting about 30–36% by weight of said slurry.

12 Claims, No Drawings

CATALYST SUPPORT COATING SLURRY AND COATINGS

This invention relates to a coating slurry for forming a tightly adherent, thermally durable catalyst support coating on a refractory ceramic or metallized ceramic substrate without risk of gel formation, the slurry containing a relatively high loading of solids.

By way of exemplifying my invention, automotive emissions control systems may use ceramic monolithic catalysts comprising a fired refractory substrate or a honeycomb having a coating of a high surface area material. The coating is impregnated with a catalytic agent such as the noble metals or the oxides of the transition metals of the Periodic Table of Elements. In this construction, the coating is bonded to the refractory surface and serves (1) to increase the surface area, (2) to disperse the catalytic agent and, (3) may itself be catalytically active as in the case of the active alumina coatings of my invention.

As is readily understood, the coating is very important to the optimum performance and life of monolithic catalysts. Any failure of the coating as by sintering, shrinkage or spalling can lead either to the loss or substantial deactivation of the catalytic agent.

While coatings may be applied from solutions of alumina salts by precipitation onto a substrate, the coatings of my invention are applied using a slurry or suspension of insoluble alumina compounds. The applied slurry is then dried and calcined to form the highly porous and activated alumina coating. U.S. Pat. No. 3,565,830 to Keith, issued Feb. 23, 1971, discloses the use of coatings formed from slurries containing the trihydrate form of hydrous alumina, i.e., one or more of gibbsite, bayerite and nordstrandite. The trihydrate is used in excess of 50% by weight of solids, at least 5% of the monohydrate form, boehmite, being also used. The materials are ground to provide a thixotropic slip, total solids therein amounting to about 10 to 70% by weight.

In using alumina alpha monohydrate, boehmite, or pseudoboehmite as the precursor forms of active alumina, I have found it necessary to use an acid, e.g., hydrochloric, nitric, acetic, etc., as a peptizing agent and to use only dilute suspensions of about 5% or less solids content to prevent gelation. Since the coatings are generally applied by dipping, gradual gelation changes the application characteristics, i.e., viscosity, absorption rate, flow rate, so as to make coating difficult to control and therefore non-uniform, and at times impossible to accomplish. Further, the use of dilute suspensions, while avoiding the problems of thixotropic gel formation, necessitate multiple applications with drying after each application to obtain even a moderate coating. It is therefore desirable, from a manufacturing standpoint, to use a rheologically stable, nonthixotropic coating slurry that can be applied in a single step or with a minimum number of applications to achieve the desired coating thickness.

In accordance with my invention, I have developed a coating slurry for coating substrates which does not require the addition of peptizing agents such as hydrochloric acid while being suitable for handling in high solids content dispersions. Also, the constituency of my slurry eliminates the need for any surfactant and binder materials which are not infrequently used to obtain desired coating characteristics both in application and as a calcined coating, e.g., hardness and adhesion to the support structure.

More particularly, I have developed a coating slurry consisting essentially of a colloidal fumed alumina and alpha alumina monohydrate, boehmite, or pseudoboehmite, in water, deionized water such as distilled water being preferred. The weight ratio of solids to water found to be most suitable is about 1:2, or about 30–36% solids to about 64–70% water. I have found that a solids content of 40% by weight produces a thixotropic mixture and thick suspension which is difficult to pass through the fine passages of the monolith support body. The slurries of my invention produce low yield point suspensions which have flow characteristics of colloidal or Newtonian suspensions. While a solids content of less than about 30% by weight may be used, this is not preferred since more than one dip application would be required to obtain a coating of moderate (0.001 inch) thickness.

In the slurries of my invention the fumed alumina may be used in amounts of from 5 to 70 weight percent solids, the balance being boehmite or pseudoboehmite sized so as to pass through a 325 mesh (44 microns) screen. The fumed alumina is a very fine grained gamma alumina having a size of about 200A and less. The fumed alumina has three primary functions in the slurry — it serves to disperse the precursor alumina, e.g., alpha monohydrate alumina, without the need for peptizing agents, it acts as a binder to give coherence within the coating and adherence to the support due to the penetrating ability of the fine grains, and it enables increasing the alumina content of the slurry to enable more alumina to be deposited per dip application.

In formulating and testing various mixtures within the general scope of my invention, I have found that the use of fumed alumina in excess of about 70 weight percent of solids results in unacceptable coatings since they exhibit excessive shrinkage on drying with resultant cracking, crazing, and spalling. These unacceptable conditions result from the fact that internal cohesion forces overcome the adhesive force to the honeycomb support or substrate. Correspondingly, the use of fumed alumina in amounts less than 5% by weight results in unsatisfactory bonding strength both cohesively and adhesively, the coating having a tendency to dust and to flake off.

The fumed alumina is obtained by passing aluminum trichloride vapor through a flame, and is available commercially as Alon Fumed Alumina from the Cabot Corporation, Boston, Mass. The alumina alpha monohydrate is available as Dispal "M" Dispersible Alumina from Continental Oil Company, Ponca City, Oklahoma. Pseudoboehmite is available as Gel Alumina from Kaiser Chemical Corporation.

Table I shows by way of example a comparison of a preferred slurry in accordance with my invention as compared with slurries of prior art types, it being readily apparent that my invention has substantial benefits over the prior art mixtures.

Table I

| Slurry | % by weight | Composition | Properties |
| --- | --- | --- | --- |
| A | 12% | alpha alumina monohydrate or pseudoboehmite | No gel formation. Amount applied in |
|  | 21% | fumed alumina | one application - |

Table I-continued

| Slurry | % by weight | Composition | Properties |
|---|---|---|---|
| | 67% | distilled water | 5.4% by weight. |
| B | 33% | alpha alumina monohydrate | Gelled when prepared. |
| | 67% | distilled water | |
| C | 33.3% | alpha alumina monohydrate | Gelled in 30 minutes. |
| | 64.7% | distilled water | |
| | 2.0% | concentrated (37%) HCl | |
| D | 10% | alpha alumina monohydrate | Gelled in 6 days. |
| | 0.8% | concentrated HCl | Amount applied in |
| | 89.2% | distilled water | one application - 1.1% by weight. |

Table II shows the superior thermal durability of the coating resulting from the use of slurries of my invention, a comparison being made of the BET surface area with time at 1000° C in ambient air, the surface area being measured after each stage of heating with a single point nitrogen adsorption apparatus.

Table II

| | BET Surface Area - $m^2/g$ | | | | |
|---|---|---|---|---|---|
| | Time - hours | | | | |
| Alumina | 0 | 20 | 100 | 250 | 350 |
| alpha trihydrate | 85 | 20 | 10 | 5 | 0 |
| fumed alumina | 115 | 66 | 66 | 66 | 66 |
| alpha monohydrate | 50 | 66 | 60 | 57 | 55 |
| GEL alumina | 216 | 160 | 135 | 104 | 100 |

It can be seen that while GEL alumina, pseudoboehmite, surface area falls rapidly with time, it tends to level out at about 100 after 350 hours. Fumed alumina and boehmite each tend to level out after 20 hours of soaking, the surface area after prolonged heating being about 66 and 55, respectively. Alpha trihydrate on the other hand tends to sinter with prolonged heating, dropping sharply in surface area during the first 20 hours of heating. This would indicate that alpha trihydrate, gibbsite, should not be used as a precursor material for active alumina, gamma and chi, where it was not precalcined at temperatures not in excess of about 800° C before use as a coating material since, in a catalytic converter for vehicle emission control, gas temperatures can run from 900° to 1200° C and higher.

In preparing the slurries of my invention, the desired amount of fumed alumina and alpha monohydrate or pseudoboehmite alumina is mixed with distilled water as exemplified in slurry A of Table I. The solids are then dispersed in the water by mixing in a blender for from about 5 to 10 minutes, or by ball-milling for a period of from about 1.5 – 2 hours, until a homogeneous suspension is achieved.

In the application of the slurry to a honeycomb substrate for use in a vehicle emissions catalytic converter, the substrate is dipped into the slurry and stirred therethrough for complete penetration of all channels and coating of all surfaces and for obtaining a sufficient depth of coating for the intended use upon drying and calcining. The coated substrate is dried by heating followed by calcining at a temperature of about 500° to 800° C so as to drive off the structural water of hydration and thus activate the alpha monohydrate alumina by forming gamma alumina, it being understood that a small amount of precursor material may remain unconverted depending on the calcining time and temperature. Where pseudoboehmite is used, eta-alumina is formed. A calcining temperature of about 650° – 750° C is preferred and may be done in air for a period of about 3 hours or such time as is required to convert to active alumina.

While I have exemplified my invention by a preferred composition, slurry A of Table I, as applied to a monolithic support structure for emissions catalysts, a further example is the use of the coating of my invention on the metallized surface of a zirconia body used as an oxygen sensor in closed cycle emissions control systems, such a device being disclosed in U.S. Pat. No. 3,844,920 issued to Burgett et al on Oct. 29, 1974 and U.S. Pat. No. 3,645,875 issued to Record et al on Feb. 29, 1972.

A preferred composition for use on a zirconia oxygen detector consists essentially of about the following:

| | | | % by weight |
|---|---|---|---|
| 75% | alumina alpha monohydrate | 100 grams | 25% |
| 25% | fumed alumina | 100 grams | 8% |
| | distilled water | 200 grams | 67% |

The solids are suspended in the water in the manner described above, i.e., ball milling for about 2 hours. The metallized (i.e., platinum) zirconia body is dipped into the slurry which is then dried and fired in the manner described. The fine grained fumed alumina penetrates the pores of the metal coating on the ceramic base and assures contact therewith and tight adherence thereto and penetration by impregnating metal as hereinafter described. The coating may be impregnated with a suitable quantity of soluble salt of a desired catalyst which is subsequently reduced, all in the manner well known in the art and forming no part of my invention.

It should be noted that the alpha monohydrate alumina or pseudoboehmite material may be calcined prior to its suspension in water, in which case the water may contain the appropriate amount of acid catalyst salt, i.e., chloroplatinic acid, without risk of gelling since all solids have then been converted to the gamma system active form of alumina. In such case, the calcining step after dip coating is no longer necessary.

From the foregoing description, it can be readily seen that the use of fumed alumina in combination with alumina alpha monohydrate, my preferred embodiment, or pseudoboehmite enables wide flexibility in the application of slurries for high surface area coatings for use as support coatings for catalyst materials or otherwise, all as covered by the scope of the claims which follow.

What is claimed is:

1. A ceramic support coating slurry resistant to gel formation and adapted to form a porous, substantially uniform, thermally durable and adherent coating on a refractory ceramic substrate, consisting essentially of very fine grained gamma alumina having a size not larger than about 200 A in the amount of about 5 to 70 weight percent of the solids and one of the active alumina precursors consisting of alpha alumina monohydrate and pseudoboehmite in the amount of about 30 to 95 weight percent of the solids, said alumina and precursor being suspended in sufficient deionized water to form a slurry having the desired application characteristics, said solids being present in an amount of about 30–36% by weight of said slurry, said gamma alumina serving to disperse said precursor without the need for peptizing agents and functioning as a binder to give coherence within the coating and adherence to the substrate.

2. A coating slurry as set forth in claim 1 formed with about 21% of said gamma alumina, about 12% precursor and about 67% distilled water, all in percent by weight.

3. A coating slurry as set forth in claim 1 formed with about 8% of said gamma alumina, about 25% precursor, and about 67% distilled water, all in percent by weight.

4. A coating slurry as set forth in claim 2 wherein said precursor has been calcined to eliminate water of hydration to form gamma or eta alumina.

5. A coating slurry as set forth in claim 3 wherein said precursor has been calcined to eliminate water of hydration to form gamma or eta alumina.

6. A substantially uniform, thermally durable calcined porous coating on a refractory ceramic or metallized ceramic support, said coating having resistance to chalking, cracking and spalling and consisting essentially of about 5 to 70 weight percent very fine grained gamma alumina having a size not larger than about 200 A and the balance being either gamma or eta alumina formed from alpha alumina monohydrate or pseudoboehmite having a size such as to pass through a 325 mesh screen.

7. A coating as set forth in claim 6 wherein said very fine grained gamma alumina is present in the amount of about 65% by weight.

8. A coating as set forth in claim 6 wherein said very fine grained gamma alumina is present in the amount of about 25% by weight.

9. A method for applying a porous, substantially uniform, thermally durable and adherent coating to a refractory ceramic or metallized ceramic support comprising the steps of making an aqueous, non-thixotropic homogeneous suspension consisting essentially of from about 5 to 70 weight percent of the solids of a very fine grained gamma alumina having a size not larger than about 200 A and from about 30 to 95 weight percent of one of the active alumina precursors consisting of alpha alumina monohydrate and pseudoboehmite in sufficient deionized water to form the desired application characteristics, applying said suspension to the surfaces of said support, drying said coated support followed by calcining at a temperature of from about 500° to 800° C. so as to drive off structural water of hydration and thus activate the precursor material by forming the gamma or eta alumina, said very fine grained gamma alumina serving to disperse said precursor without the need for peptizing agents and functioning as a binder to give coherence within the coating and adherence to the support, and said solids comprising about 30–36% by weight of said suspension.

10. A method as set forth in claim 9 wherein said calcining is conducted at a temperature of from 650°–750° C.

11. A method as set forth in claim 9 wherein said suspension contains about 21% of said gamma alumina, about 12% precursor and about 67% distilled water, all in percent by weight.

12. A method as set forth in claim 9 wherein said suspension contains about 8% of said gamma alumina, about 25% precursor and about 67% distilled water, all in percent by weight.

* * * * *

UNITED STATES PATENT AND TRADEMARK OFFICE
CERTIFICATE OF CORRECTION

PATENT NO. : 4,116,883

DATED : September 26, 1978

INVENTOR(S) : James F. Rhodes

It is certified that error appears in the above-identified patent and that said Letters Patent are hereby corrected as shown below:

Column 4, line 14, after "Table I" and before ",as" insert -- whereby the fumed alumina is present in the calcined coating in an amount of about 65% by weight --.

Signed and Sealed this

First Day of May 1979

[SEAL]

Attest:

RUTH C. MASON
Attesting Officer

DONALD W. BANNER
Commissioner of Patents and Trademarks